B. J. LA MOTHE.
Car-Axle.
No. 43,033.
Patented June 7, 1864.
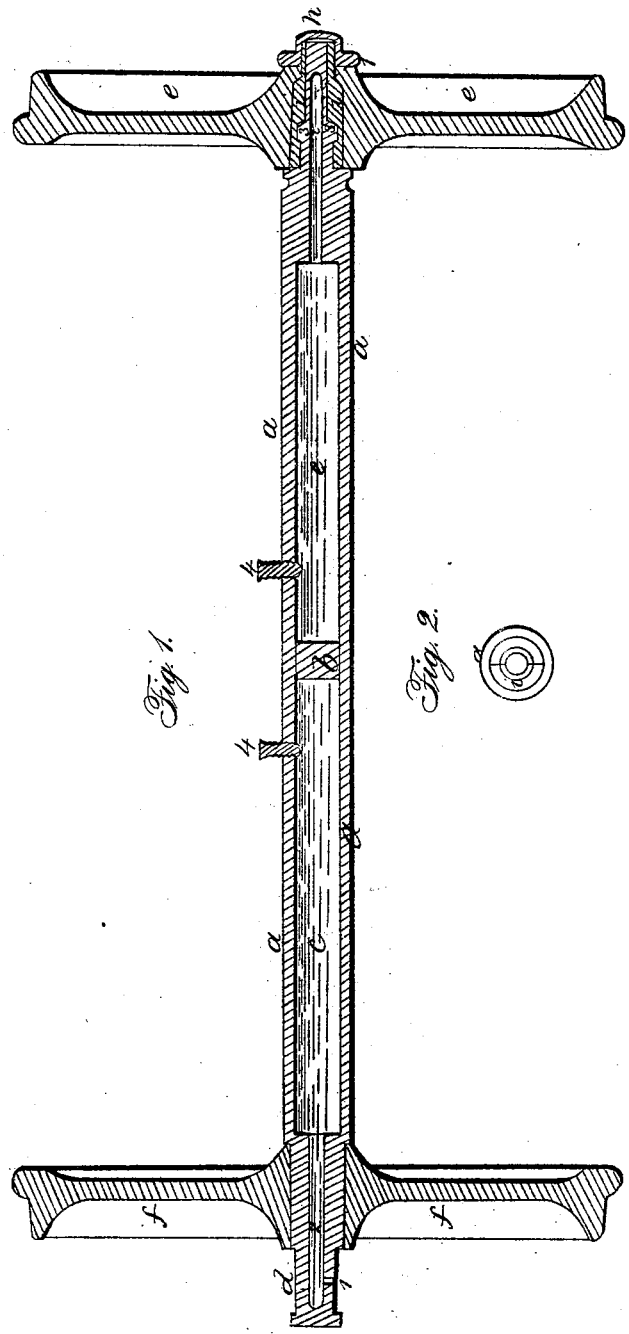
Witnesses:
Inventor:

UNITED STATES PATENT OFFICE.

B. J. LA MOTHE, OF NEW YORK, N. Y.

IMPROVED MODE OF LUBRICATING CAR-AXLES.

Specification forming part of Letters Patent No. 43,033, dated June 7, 1864.

*To all whom it may concern:*

Be it known that I, BERNARD J. LA MOTHE, of the city and State of New York, have invented, made, and applied to use a certain new and useful Improvement in Means for Lubricating Car-Axles, &c.; and I do hereby declare the following to be a full, clear, and exact description of the said invention, reference being had to the annexed drawings, making part of this specification, wherein—

Figure 1 is a longitudinal section of a car-axle and pair of wheels, illustrating my improvement. Fig. 2 is an end view showing the axle and divided box around the same, upon which the wheel is attached.

Similar letters denote the same parts.

The nature of my said invention consists in a reservoir containing the lubricating material formed in the axle itself, and communicating by a hole with the box to be lubricated, so that the oil will flow by the concussion or motion of the wheel or axle, and when not in motion the said lubricating material will be retained by the action of the atmosphere, as there is but one hole for the same to work out at.

In the drawings, $a$ is an axle that is formed hollow either by forging it as a pipe or by any other known mode. In the central portion thereof is a division or plug at $b$, so as to separate the two oil-receptacles $c$ $c$.

$d$ is the bearing or journal of the axle, that at one end I have represented as adapted to the ordinary journal-box set to slide in pillars below the car, and in this journal is a hole, 1, communicating with the hole 2, that passes through the solid portion of the axle to the pipe-shaped portion forming the oil reservoir.

The other end of the axle is similarly formed with the holes, but the wheel $e$, instead of fitting tightly upon and revolving with the axle, as is the case with the wheel $f$. Said wheel $e$ is independent, so that a curve can be turned without strain on the axle. This wheel $e$ is upon a divided box, $i$, that surrounds the axle or journal, and a collar, 3, formed thereon, and said box $i$ is passed into a tapering hole in the wheel and retained by means of a nut, $h$, or similar device, so that the box $i$ will revolve with the wheel $e$, and hence the lubrication between the box $i$ and axle will be supplied from the oil-receptacle $c$ through the holes 1 and 2, as in the case of the ordinary journal to the wheel, represented on the other end of the axle.

4 4 are screw-plugs to the openings in the reservoirs, by the removal of which the lubricating material may be introduced.

It will be evident that this mode of lubricating may be applied to the ordinary revolving car axle or shaft, or that such a box as the box $i$ might be applied to both wheels and the axle or shaft remain stationary.

What I claim, and desire to secure by Letters Patent, is—

A reservoir for lubricating material within the axle or shaft, and supplying such lubricating material to the bearings through holes, in the manner and for the purposes specified.

In witness whereof I have hereunto set my signature this 11th day of April, 1864.

B. J. LA MOTHE.

Witnesses:
  THOS. GEO. HAROLD,
  CHAS. H. SMITH.